United States Patent
Magni et al.

(10) Patent No.: US 9,376,258 B2
(45) Date of Patent: Jun. 28, 2016

(54) ACCUMULATION PALLET CONVEYOR, FOR RECIRCULATING A PLURALITY OF PALLETS IN AN ENDLESS HORIZONTAL CAROUSEL, AND METHOD FOR CONTROLLING THIS CONVEYOR

(71) Applicant: Comau S.p.A., Grugliasco (Turin) (IT)

(72) Inventors: Gianni Magni, Turin (IT); Gianpiero Gromme, Turin (IT)

(73) Assignee: Comau S.p.A., Grugliasco (Torino) (IT)

( * ) Notice: Subject to any disclaimer, the term of this patent is extended or adjusted under 35 U.S.C. 154(b) by 0 days.

(21) Appl. No.: 14/075,596

(22) Filed: Nov. 8, 2013

(65) Prior Publication Data
US 2014/0138213 A1    May 22, 2014

(30) Foreign Application Priority Data
Nov. 20, 2012 (EP) ..................................... 12193340

(51) Int. Cl.
| | | |
|---|---|---|
| B65G 43/08 | (2006.01) | |
| B65G 17/12 | (2006.01) | |
| B65G 19/02 | (2006.01) | |
| B65G 1/133 | (2006.01) | |

(52) U.S. Cl.
CPC ................ B65G 17/12 (2013.01); B65G 1/133 (2013.01); B65G 19/02 (2013.01)

(58) Field of Classification Search
CPC ........ B65G 17/12; B65G 17/22; B65G 1/133; B65G 19/02
USPC ........... 198/343.1, 343.2, 347.3, 465.1, 465.2
See application file for complete search history.

(56) References Cited

U.S. PATENT DOCUMENTS

| | | | | |
|---|---|---|---|---|
| 4,431,102 A | * | 2/1984 | Bittner | ........................ 198/345.3 |
| 4,991,719 A | * | 2/1991 | Butcher | ................ B07C 5/3412 |
| | | | | 198/349.95 |
| 5,964,562 A | * | 10/1999 | Bernard et al. | .......... 414/331.03 |
| 6,019,214 A | * | 2/2000 | Herronen et al. | .......... 198/465.1 |
| 6,568,525 B2 | | 5/2003 | Stone et al. | |
| 6,591,488 B1 | | 7/2003 | Tachibana | |
| 7,258,223 B2 | * | 8/2007 | Strange | ...................... 198/465.2 |
| 2005/0247546 A1 | | 11/2005 | Strange | |
| 2010/0300841 A1 | | 12/2010 | O'Brien | |
| 2011/0314665 A1 | | 12/2011 | Kilibarda | |

FOREIGN PATENT DOCUMENTS

| | | |
|---|---|---|
| JP | 59073246 | 4/1984 |
| JP | 05278854 | 10/1993 |
| JP | 2007216340 | 8/2007 |

* cited by examiner

Primary Examiner — William R Harp
(74) Attorney, Agent, or Firm — Young Basile Hanlon & MacFarlane P.C.

(57) ABSTRACT

A plurality of different types of components is fed to a production line or cell by means of a conveyor for recirculating a plurality of pallets on which said components are carried. The conveyor comprises a horizontal carousel for recirculating the pallets along an endless path. The conveyor is able to cause the pallets to circulate in any of the two circulation directions, and the direction of circulation of the pallets is changed according to the type of component required by the production line or cell in each step of operation, in such a way as to carry a component of the type required to the production line or cell in the shortest possible time. The conveyor comprises a single chain-tensioning device designed to tension the chain properly whenever the direction of movement of the chain is reversed.

14 Claims, 12 Drawing Sheets

ACCUMULATION PALLET CONVEYOR, FOR RECIRCULATING A PLURALITY OF PALLETS IN AN ENDLESS HORIZONTAL CAROUSEL, AND METHOD FOR CONTROLLING THIS CONVEYOR

TECHNICAL FIELD

The present invention relates to accumulation pallet conveyors for feeding a plurality of different types of components to a production line or cell.

BACKGROUND

Accumulation pallet conveyors for feeding a plurality of different types of components to a production line or cell may be of a conveyor of the horizontal-carousel type, for recirculating the pallets along an endless path, with:
  a supporting structure;
  an endless chain engaged on sprocket wheels which are rotatably mounted about vertical axes on said supporting structure;
  motor means for controlling the movement of said endless chain;
  a plurality of pallet-carrying members drawn by said chain along said horizontal carousel, each pallet-carrying member being provided with means for engagement of the chain that enable said chain to move freely with respect to the pallet-carrying member in the case where this is stopped in a given position along the conveyor; and
  a plurality of pallets, each carried by a respective pallet-carrying member and prearranged for conveying one or more components of different types from an area for receiving said components on the conveyor to an unloading area, where said components are unloaded from the conveyor to be loaded, for example, on a production line or cell.

An accumulation pallet conveyor of the type referred to above is, for example, described in the document No. U.S. Pat. No. 6,568,525 B2.

In the case where a conveyor of the type referred to above is used for feeding components of a series of different types to a production line or cell, there exists the problem of adapting rapidly the sequence of the types of components that are fed to the production line or cell as a function of the production needs. In the known solutions developed so far, the conveyor constitutes a rigid system that is to be loaded with a sequence of components corresponding to the sequence required on the production line or cell, this preventing a different request as regards the sequence of the different types of component to be supplied to the production line from being met promptly. The document No. U.S. Pat. No. 6,568,525 B2 mentioned above proposes a solution that guarantees a high degree of flexibility and rapidity of adaptation in the sequence of components that is supplied to the production line or cell, envisaging a plurality of conveyors that serve one and the same loading position on the line, each conveyor being dedicated to a respective type of component. Said solution is of course disadvantageous from the standpoints of cost and of the space occupied.

SUMMARY

One object of the present invention is to overcome the aforesaid drawbacks by providing an accumulation pallet conveyor and a method for controlling this conveyor that will guarantee a high degree of flexibility and rapidity of adaptation in the supply of the different types of components to a production line or cell and that may be produced with simple, low-cost means of minor overall dimensions. A further object of the invention is to provide a conveyor that will be simple and reliable in operation and will only call for minor maintenance operations. In the specific case of application in a plant for producing motor-vehicles, one aim of the invention is to guarantee the possibility of supplying with maximum possible efficiency components of different models of motor vehicle to the production line, and any number of different components for each model of motor vehicle, guaranteeing the possibility of varying in extremely short times the type and quantities of the models produced, as well as the corresponding production percentages.

With a view to achieving the above purposes, one subject of the present invention is a method for controlling supply of a plurality of different types of components to a production line or cell, wherein a conveyor is provided which recirculates a plurality of pallets supporting said components adjacent to the production line or cell, so as to carry said components from an area where said components are received on the conveyor to an area for unloading the components from the conveyor (directly onto the production line or cell or into an intermediate position between the conveyor and the line), wherein said conveyor is a horizontal-carousel conveyor for recirculating the pallets along an endless path, said method being characterized in that said conveyor is able to cause the pallets to circulate in any of the two circulation direction, and in that in each step of operation of the production line or cell the type of component that is required by the production line or cell is detected and the direction of circulation of the pallets in the conveyor is changed in such a way as to carry a component of the type required to the production line or cell in the shortest possible time.

In the specific case of application in a plant for producing motor vehicles, the aforesaid pallets are prearranged for carrying components of different models of motor vehicle, and different components for each model of motor vehicle, each pallet being prearranged for carrying one or more components of the same model of motor vehicle or of different models. The pallets can be prearranged for carrying any number of different components. Thanks to the aforesaid characteristics, the type and quantities of the models produced, as well as the corresponding production percentages, are enabled to be varied in extremely short times.

In a preferred embodiment, the pallets can be rapidly coupled to respective pallet-carrying members prearranged along the conveyor, with the aid of fast-coupling means of any known type. In this way, it is possible to replace rapidly any number of pallets prearranged on the conveyor to have pallets adapted to any specific desired type of component and to any specific desired mix of components.

Also forming a subject of the invention is the aforesaid conveyor taken in itself, having all the characteristics referred to at the beginning of the present description and moreover characterized in that electronic control means of said conveyor are provided for controlling the aforesaid motor means in order to feed the pallets in one direction of circulation or in the other, said electronic control means being programmed for receiving information on the type of component that is required by the production line or cell in each production step and for changing the direction of circulation of the pallets in the conveyor in such a way as to carry a component of the type required to the production line or cell in the shortest possible time.

According to a further characteristic of the present invention, the conveyor comprises a single chain-tensioning device for tensioning the chain in the two opposite directions so as to guarantee proper tensioning of the chain whatever the direction of movement of the chain.

Preferably, the chain-tensioning device comprises:
two main chain-tensioning sprocket wheels on which the chain engages in succession;
two main springs that recall the shafts of said main chain-tensioning sprocket wheels in two mutually opposite directions; and
two cam surfaces, formed on two separate auxiliary cam elements or on a single auxiliary element, which engage cam-follower elements operatively connected to the shafts of said main chain-tensioning sprocket wheels so as to tend to push said shafts in said mutually opposite directions under the action of auxiliary elastic means in such a way that, for each direction of movement of the chain, one of said main chain-tensioning sprocket wheels tensions the chain as a result of its displacement in a first direction caused by the main spring and by the cam surface associated thereto, whilst the other chain-tensioning sprocket wheel is hindered by the cam surface associated thereto from moving in said first direction, the aforesaid functions of the two main chain-tensioning sprocket wheels and the functions of the two cam surfaces being reversed with each other when the direction of movement of the chain is reversed.

In a first embodiment, the cam surfaces are formed on two levers pivotally mounted on the supporting structure of the chain-tensioning device about two axes set at a distance from one another and each having a cam surface in contact with a cam-follower element operatively connected to the shaft of a respective chain-tensioning sprocket wheel.

In a second and preferred embodiment, the cam surfaces are formed on two opposite end portions of a single lever articulated centrally to the supporting structure of the chain-tensioning device, each end portion having a cam surface in contact with a cam-follower element operatively connected to the shaft of a respective chain-tensioning sprocket wheel.

According to a further preferred characteristic, the aforesaid cam surface is shaped in such a way as to maintain substantially constant the overall force due to the main spring and to the auxiliary cam element that is applied to the respective main chain-tensioning sprocket wheel as the deformation of the main spring varies.

In a conveyor according to the invention, when the direction of circulation of the pallets is reversed, the chain tends to slacken in the stretch set downstream of the drive sprocket wheel on which the chain is engaged, but the aforesaid chain-tensioning device acts automatically to restore the right tension. Said solution enables a considerable simplification and saving of components with respect to the case where two separate chain-tensioning devices were to be provided, designed to intervene each for a respective direction of circulation of the chain.

In addition to performing the function of tensioning the chain properly whenever the direction of movement thereof is reversed, the chain-tensioning device forming a subject of the present invention at each moment also recovers automatically any play that may occur in the chain as a result of its wear.

According to a further characteristic, associated to the chain-tensioning device are sensor means designed to detect when the lengthening of the chain due to wear exceeds a pre-set value, in which case there may be envisaged, for example, automatic arrest of the machine to point out the need for intervention on the chain to eliminate one or more links or replace the chain.

BRIEF DESCRIPTION OF THE DRAWINGS

Further characteristics and advantages of the invention will emerge from the ensuing description, with reference to the annexed drawings, which are provided purely by way of non-limiting example and in which.

DETAILED DESCRIPTION

Figure 1:
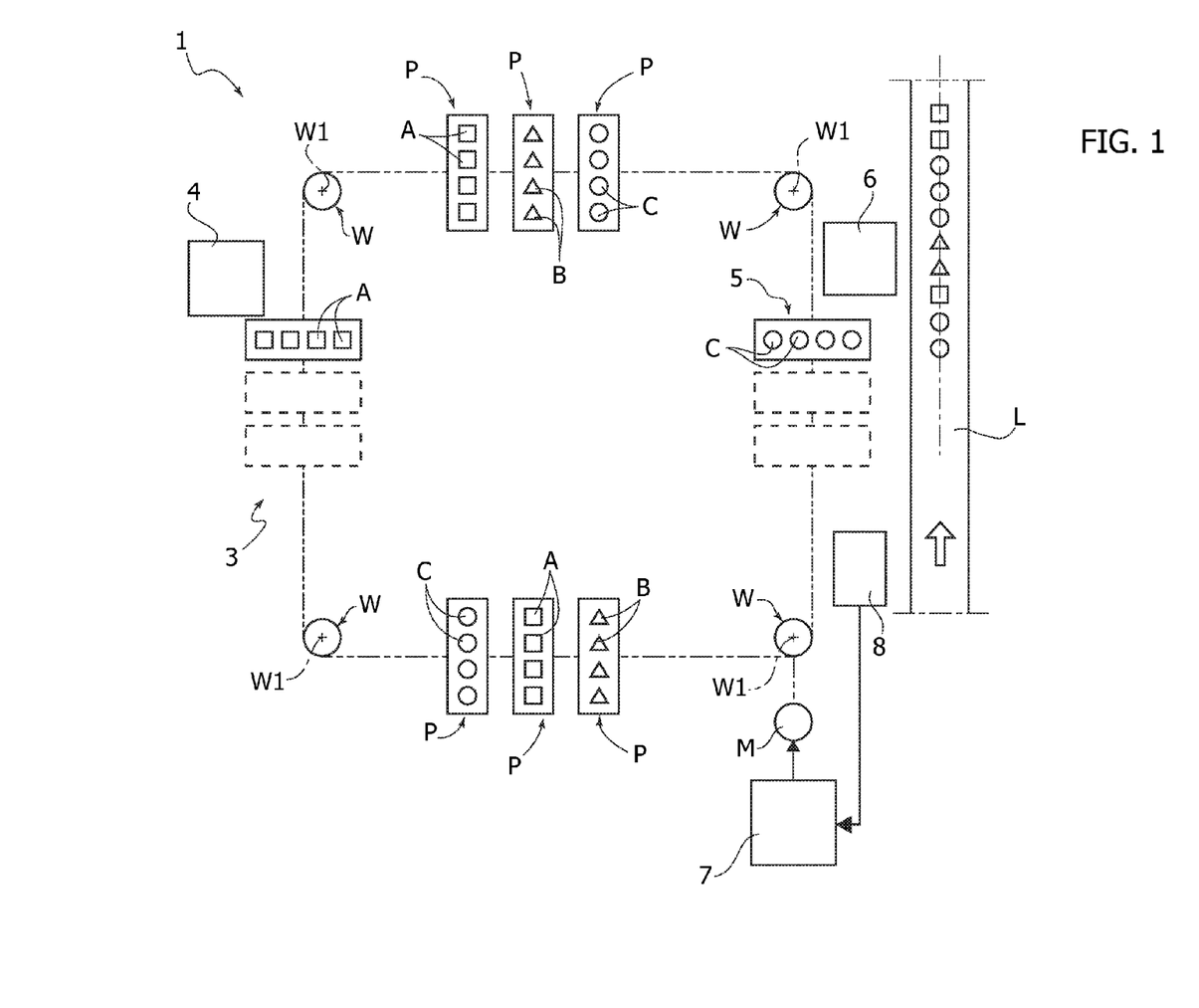
FIG. 1 is a schematic top plan view that illustrates the principle underlying the method according to the invention.

With reference to FIG. 1, number 1 designates as a whole an accumulation pallet conveyor, with horizontal carousel, for recirculating a plurality of pallets P that support a plurality of components A, B, C, etc. of different types (schematically represented with different symbols) that are to be supplied to a production line L.

The example regards an application for a motor-vehicle production line where the pallets P are prearranged for carrying components of different models of motor vehicle, and different components for each model of motor vehicle, each pallet being prearranged for carrying one or more components of the same model of motor vehicle or of different models. The number of different components (A, B, C, etc.) envisaged for being carried on the conveyor 1 may be any. According to a technique in itself conventional, each pallet is provided with supporting and reference elements (some of which are visible, for example, in FIG. 3) for supporting and referencing in position specific types of components. FIG. 1 shows just three types of different components merely by way of example.

The pallets P are carried by the conveyor 1 along an endless path lying in a substantially horizontal general plane, even though of course said path may envisage ascending portions and descending portions. The conveyor 1 comprises an endless chain 2 (illustrated only schematically in FIG. 1) engaged on sprocket wheels W rotatably mounted on a supporting structure of the conveyor about respective vertical axes W1.

At least one of the sprocket wheels W is a drive sprocket wheel driven in rotation by a motor M.

According to a technique in itself known, the pallets are carried by respective pallet-carrying members (not visible in FIG. 1, but described in greater detail in what follows with reference to the other figures) that are drawn by the chain along the conveyor. For this purpose, once again according to a technique in itself known, each pallet-carrying member is provided with means for engagement of the chain (also illustrated in what follows), which normally force the pallet-carrying member to follow the movement of the chain but which are also designed to enable free movement of the chain with respect to the pallet-carrying member in the case where the movement of the latter is prevented. Consequently, if a pallet-carrying member is stopped along the path by means of an arrest device of any type, the chain can continue to move freely, and the pallet-carrying members that follow the one that has been stopped accumulate behind the latter.

In the case of the examples described, as will emerge clearly in what follows, the pallet-carrying members are designed for guaranteeing the maximum safety both for the operator, with particular reference to situations where the operator may involuntarily interfere with the pallets on the conveyor, and for the conveyor itself, in the sense that there is no risk of damage to the conveyor in the case of any involuntary interference of the pallets with the operator or with robots or other foreign bodies during operation.

In the case of the examples described, the conveyor 1 is designed to get the pallets P to circulate with the components A, B, C, etc. set thereon in both directions of circulation. This can be obtained by providing a motor M of any known type (for example, an electric motor) that is reversible in rotation, or else envisaging between the motor and the drive sprocket wheel a mechanical transmission of any known type designed to transmit motion to the driven sprocket wheel selectively either in one or in the other direction of rotation.

Provided along the conveyor 1 is a loading area 3 with one or more positions where components of the various types A, B, C, etc. are loaded onto a pallet P. Provided in the loading area 3 are arrest means of any known type (not illustrated) designed to withhold in a fixed position the pallet P that reaches a loading position within the area 3, allowing the chain 2 to run under the respective pallet-carrying member and then cause accumulation of the pallets that follow behind the pallet that is stopped in the position 3. One or more components A and/or B and/or C, etc. are loaded onto the pallet P that is in the area 3 by means of a loading device 4 (for example, a manipulator robot) or else manually by an operator. Each pallet may be provided with a plurality of components of the same type, as represented schematically in FIG. 1, or else also with components of different types, belonging to the same model of motor vehicle or to different models.

Likewise provided along the conveyor 1 is an unloading area 5 with one or more positions, where one or more of the components carried by a pallet P are unloaded therefrom. Said operation may be carried out by an unloading device 6 of any known type (for example, a manipulator robot) or else be performed manually by an operator.

The motor means M of the drive sprocket wheel W are controlled according to the desired sequence of components that is to be supplied to the production line L. For example, the motor M may be controlled by an electronic unit 7 that receives input signals from an electronic control station 8, where there is detected or set a desired sequence of components that is to be supplied to the production line L. The datum regarding the sequence of components required is transmitted to the control unit 7, which controls accordingly the activation and the direction of rotation of the drive sprocket wheel W.

As already mentioned, the horizontal-carousel conveyor 1 is able to get the pallets P to circulate in both of the directions of circulation, and the control unit 7 is programmed for changing each time the direction of circulation of the pallets P according to the sequence required by the control unit 8 so as to feed each time a component of the desired type on the production line L in as short a time as possible.

Thanks to said arrangement, it is thus possible to guarantee a high flexibility and rapidity of adaptation of the sequence of components supplied to the production line with a single conveyor and hence without high costs, without constructional complications, without any need for maintenance of a number of conveyor devices and without occupying a large space in the plant. In the specific case of a motor-vehicle production line, it is thus possible to vary in extremely short times the type and quantities of the models produced, as well as the corresponding production percentages.

Figure 2:
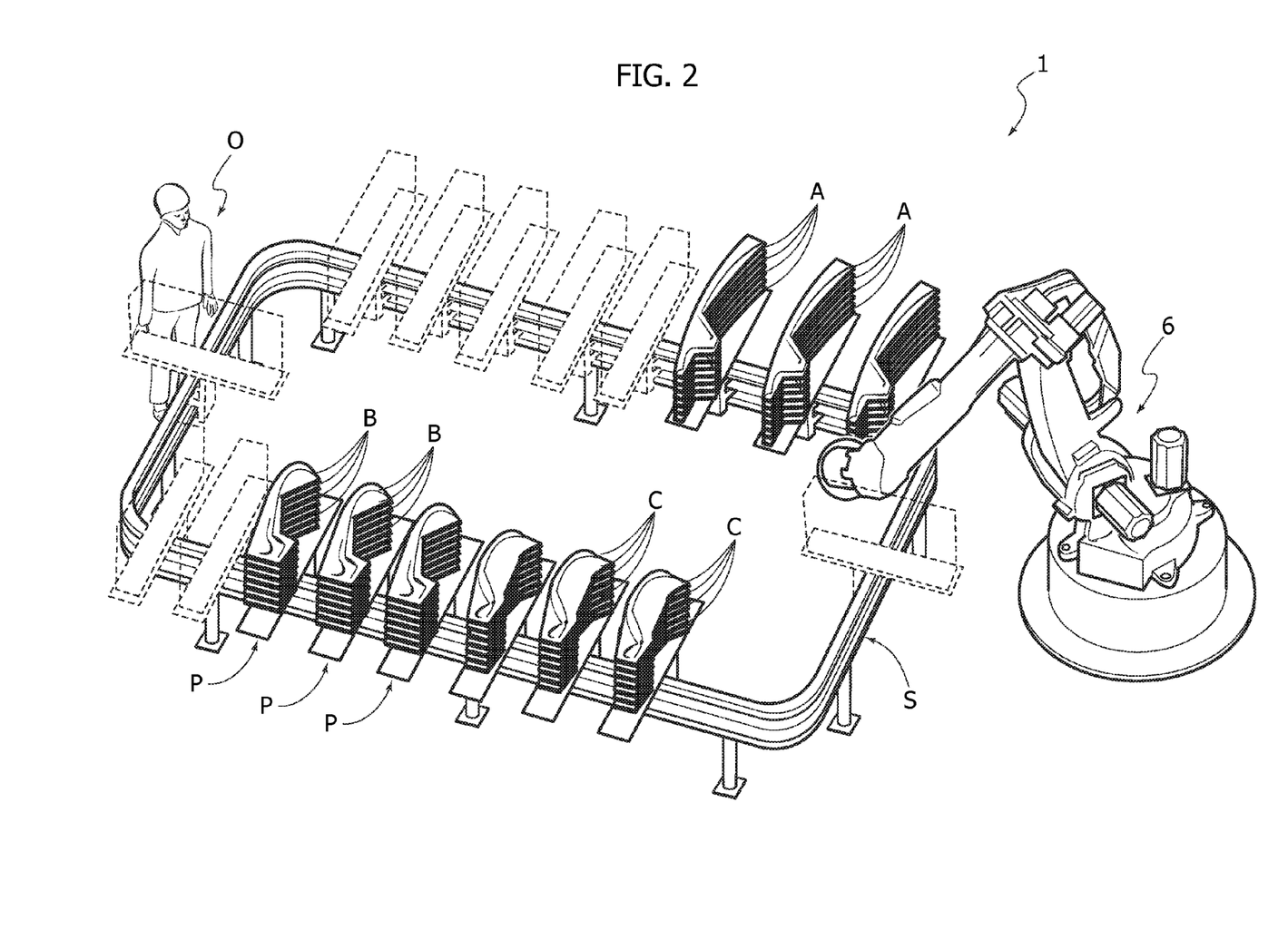
FIGS. 2, 3 and 4 are schematic and partial perspective views of different embodiments of the conveyor according to the invention.

FIG. 2 is a schematic perspective view of an example of embodiment of the system illustrated in FIG. 1, where loading of the components on the conveyor is carried out manually by an operator O, and unloading of the components onto the line is carried out by a manipulator robot 6. FIG. 2 also shows the fixed supporting structure S on which the pallet-carrying members are slidably mounted. Illustrated by way of example is the case where each pallet P carries a stack of components of the same type, specifically parts of a motor-vehicle structure.

Of course, the components unloaded from the conveyor could be positioned temporarily in a gathering area, from which they can then be picked up for use, instead of being directly fed to a production line or cell.

Figure 3:
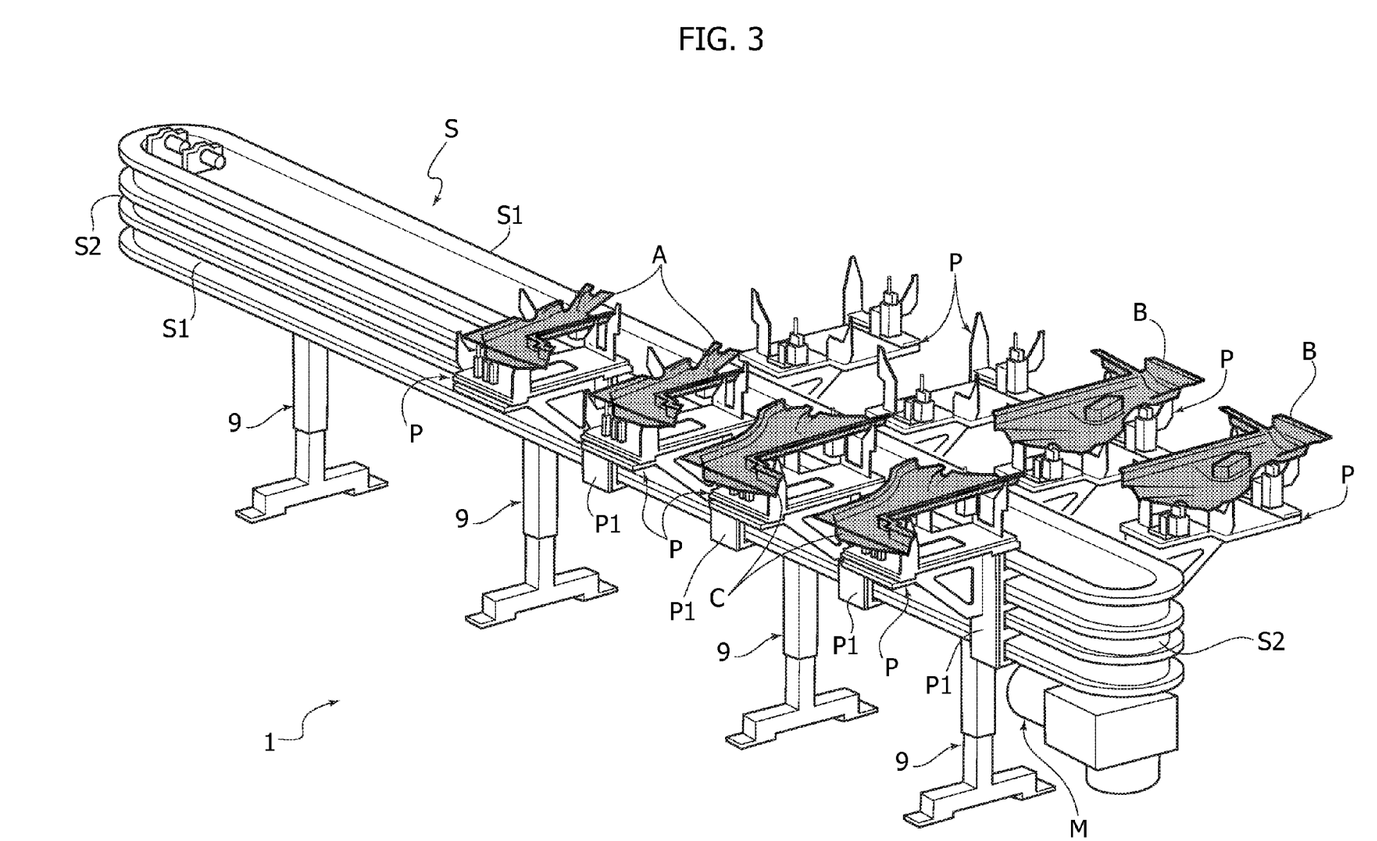

FIG. 3 shows a further possible configuration of a horizontal-carousel conveyor, where the supporting structure S has two mutually parallel longitudinal portions S1 set close to one another, connected at their ends by two curved portions S2. In this case, pallet-carrying members P1 are provided, mounted vertically on the supporting structure S of the conveyor. The pallet-carrying members P1 support the respective pallets P in cantilever fashion. According to a conventional technique, each pallet is provided with brackets and positioning elements, for proper positioning of one or more respective components A and/or B and/or C.

Figure 4:
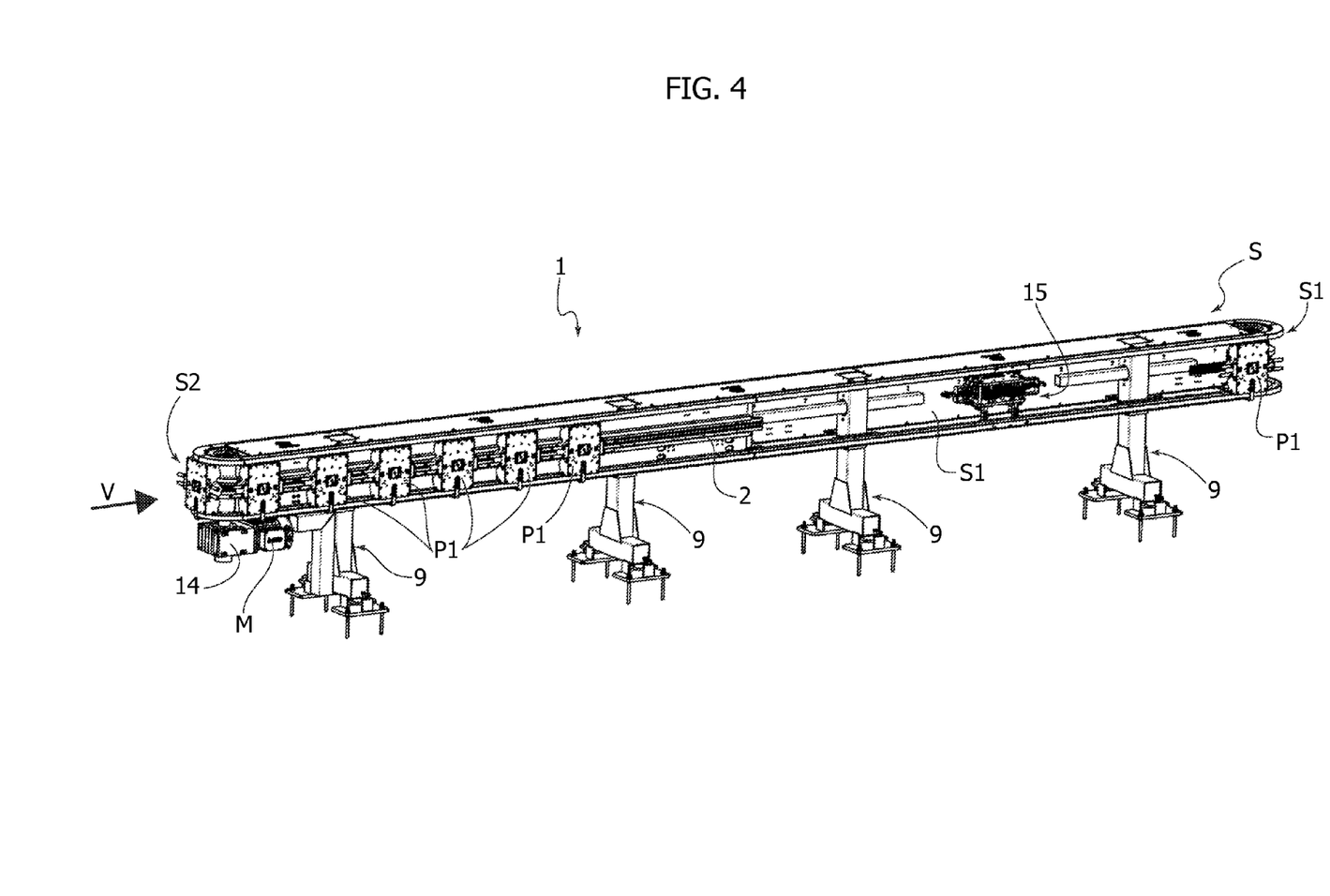

FIG. 4 is a perspective view of a concrete embodiment of a horizontal-carousel conveyor having substantially the same configuration as the one illustrated in FIG. 3. In said figure, the pallets have not been illustrated in order to represent clearly the pallet-carrying members P1.

With reference to FIG. 4, as well as to FIGS. 5 and 6, the conveyor 1 comprises a supporting structure S including a plurality of columns 9 fixed to the floor that in turn carry a supporting structure including two longitudinal portions S1 connected at their ends by two curved portions S2 that define guides C1 and 12 (described hereinafter) for guiding wheels R1, R2 carried by each pallet-carrying member P1.

The pallet-carrying members P1 are consequently in the form of carriages and are referred to hereinafter as "pallet-carrying carriages".

Of course, even though the examples illustrated show conveyor structures carried by columns fixed to the floor, it is also possible to envisage suspending said structures by means of arms fixed to a ceiling.

Figure 5:
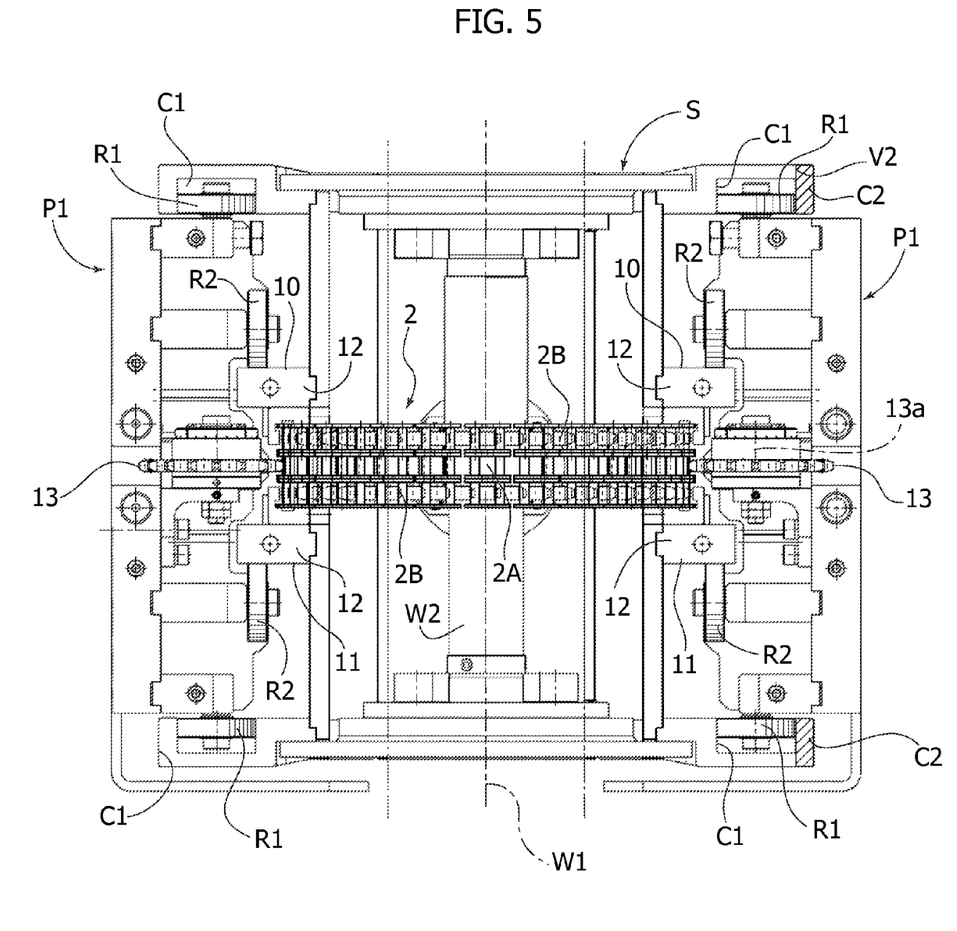
FIG. 5 is a view according to the arrow V of FIG. 4.
Figure 6:
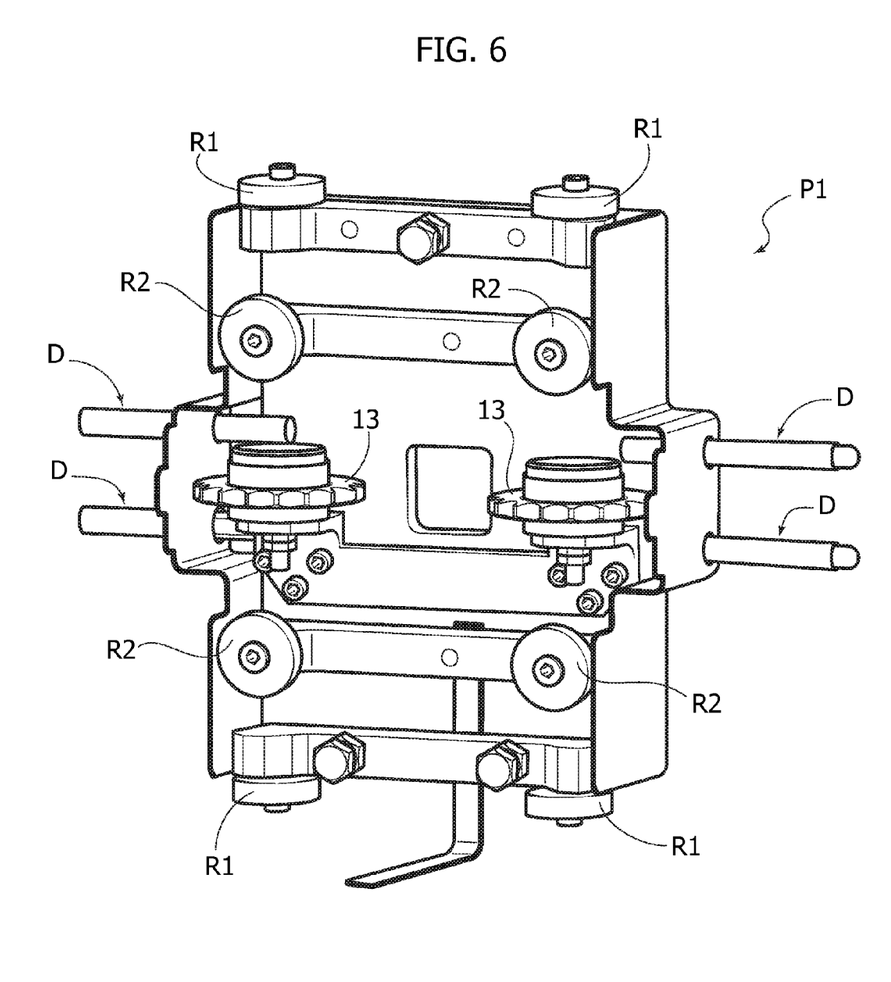
FIG. 6 is a perspective view of a pallet-carrying carriage used in a preferred embodiment of the invention.

With reference to FIG. 5, the wheels R2 are wheels with horizontal axis (in the condition where they are mounted on the conveyor), which engage the top surface 10 and the bottom surface 11 of guides 12 projecting from the lateral surface of the portions S1,S2 of the fixed supporting structure of the conveyor. In this way, the wheels R2 define the vertical position of each pallet-carrying carriage P1. The wheels R1 engage respective guide channels C1 of the supporting structure S so as to define the position of the top part and of the bottom part of each pallet-carrying carriage P1 with respect to a transverse horizontal direction. Each carriage is provided on opposite sides with spacer pins D (FIG. 6), which keep the carriages P1 set at a distance from one another when they accumulate against a carriage that is stopped along the conveyor (see FIG. 4).

In the example, in order to be able to mount the pallet-carrying carriages P1 with the wheels R1 within the respective guide channels C1, the supporting structure S is provided in a given position with removable portions C2 (FIGS. 5 and 11), which can be removed to enable mounting of each pallet-carrying carriage in the guides of the supporting structure S. After all the carriages P1 have been inserted with the wheels in the respective guides and slid along the structure of the conveyor, the channels C1 are again closed, again mounting the two removable portions C2 within corresponding seats V2 (FIG. 11).

Figure 11:
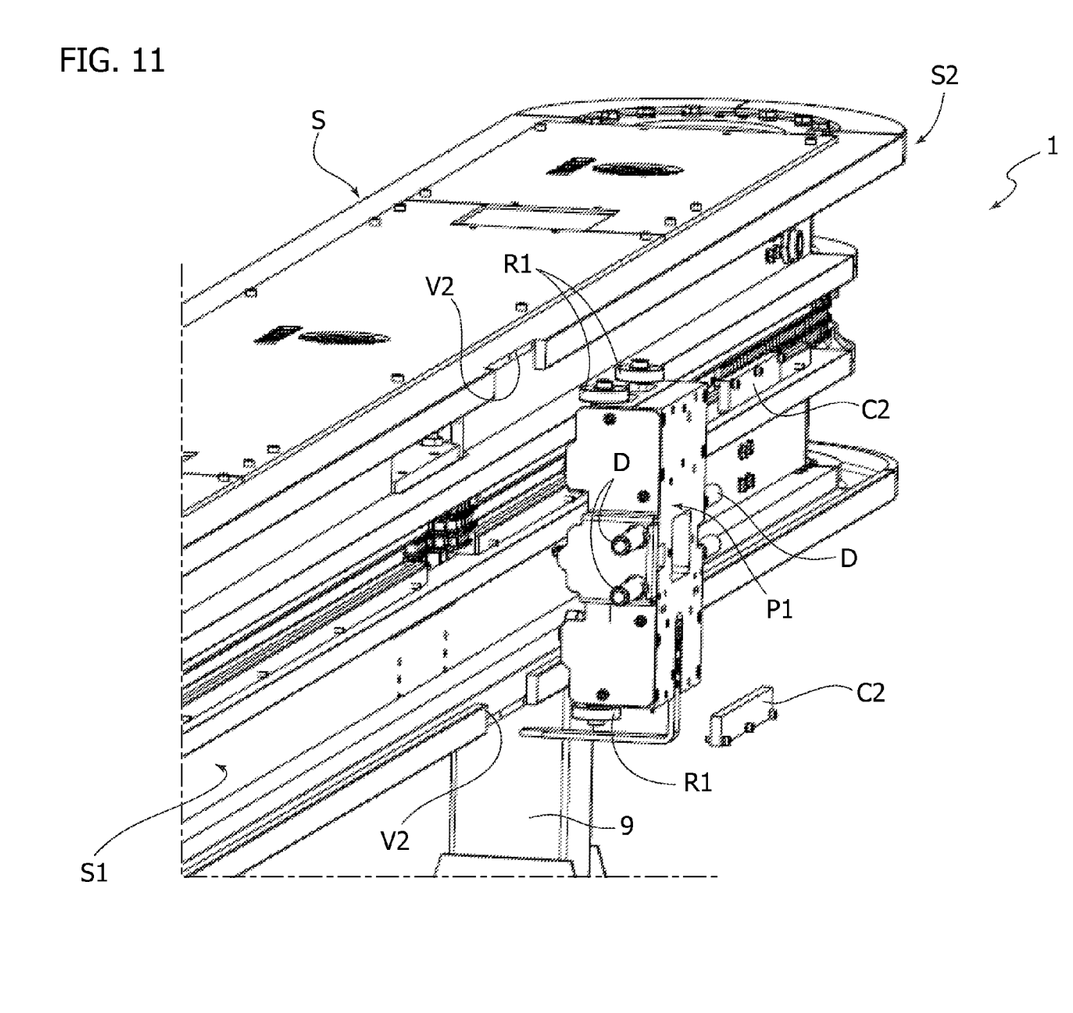
FIG. 11 is a partial perspective view at an enlarged scale of the conveyor of FIG. 4, which shows how the pallet-carrying members are mounted in the conveyor of the invention.

As mentioned, FIGS. 4, 5 and 11 do not illustrate the pallets P that are mounted in cantilever fashion each on a respective pallet-carrying carriage P1.

In a preferred embodiment, the pallets P can be coupled rapidly to respective pallet-carrying members P1 prearranged along the conveyor, with the aid of fast-coupling means of any known type. In this way, it is possible to replace rapidly any number of pallets prearranged on the conveyor to have pallets adapted to any specific desired type of component and to any specific desired mix of components.

In the embodiment illustrated in FIGS. 4-11, the conveyor 1 is provided with a chain 2 with three parallel links (see FIG. 5). The central link of the chain 2, designated by 2A, is designed to engage two sprocket wheels 13 (see FIGS. 5, 6) rotatably mounted about respective axes 13a on each pallet-carrying carriage P1, with interposition of a friction coupling that enables free rotation of the respective sprocket wheel 13 only above a given rotational torque. In this way, during normal operation of the conveyor, the sprocket wheels 13 of each pallet-carrying carriage P1 remain engaged without turning on the chain so that the respective carriage P1 is forced to follow the chain in its movement. In the case where a pallet-carrying carriage P1 is stopped along the conveyor, for example in so far as it has been stopped in the loading position 3 or the unloading position 5, or else in so far as it comes to stop against one or more carriages that have accumulated immediately upstream of one of said positions, the chain 2 continues to move with respect to the pallet-carrying carriage P1 that remains stationary in position, with consequent rotation of the sprocket wheels 13 of the carriage about their axes 13a.

As may be seen in FIG. 5, the sprocket wheels 13 of the pallet-carrying carriages P1 engage the central link of the chain 2, whereas the sprocket wheel provided at each end of the conveyor engages the side links 2B of the chain 2 (in FIG. 5 said sprocket wheel is hidden by the chain 2, but the shaft W2 carrying this sprocket wheel is visible and is rotatably mounted on the structure S about its axis W1). FIG. 4 also shows the electric motor M that governs rotation of the sprocket wheel of the chain via a reducer device 14.

As already referred to above, the motor M is able to drive the chain 2 in both of the directions of circulation and is controlled by an electronic control unit similar to the unit 7 illustrated in FIG. 1 so as to change the direction of circulation according to the need of supplying in as short a time as possible a component of a desired type to the unloading position on the production line L.

Whenever the direction of movement of the conveyor is reversed, the stretch of chain set downstream of the drive sprocket wheel (with reference to the direction of movement of the chain) undergoes slackening. It is consequently necessary to envisage means for tensioning the chain that are operative in both of the directions of movement of the chain. Said problem could be solved by providing two separate chain-tensioning devices, set along the chain on opposite sides with respect to the drive sprocket wheel, and configured for tensioning the respective branches of chain when one of them slackens following reversal of the direction of movement of the chain. In the case of the examples described, the problem is instead solved in a more efficient way by envisaging a single chain-tensioning device operative in both directions, which is able to keep the chain tensioned whatever the direction of movement of the chain and that is moreover able to recover automatically any play that may occur in the chain following upon its wear.

As may be seen in FIG. 4, the chain-tensioning device, designated as a whole by the reference number 15, is associated to one of the longitudinal branches of the chain 2, on one side of the structure of the conveyor 1.

With reference to FIGS. 7-10, the chain-tensioning device 15 comprises a supporting structure 16 anchored to the supporting structure S of the conveyor 1. The structure 16 includes a pair of parallel plates spaced apart from each other, between which a plurality of sprocket wheel units 17 are freely rotatably mounted, for directing the chain according to a path substantially in form of an omega (see FIG. 7). In the central stretch of said path, the chain 2 engages two sets 18A, 18B of main chain-tensioning sprocket wheels.

The sets 17 of transmission sprocket wheels are mounted freely so that they turn on the supporting structure 16 about fixed axes, whereas the sets of main chain-tensioning sprocket wheels 18A, 18B are mounted on shafts 180A, 180B that are biassed in mutually opposite directions X1, X2 by two main springs 19A, 19B. In the ensuing description and in the annexed drawings, the parts associated to each of the two sets of chain-tensioning sprocket wheels 18A, 18B are designated by the same reference numbers, except for the addition of the letters A and B.

Each of the two shafts 180A, 180B of the two sets 18A, 18B has the ends guided within slits of the plates constituting the fixed supporting structure 16. Each spring 19A, 19B is a helical spring set axially between a bracket 20A, 20B secured to the fixed supporting structure 16, and a contrast disk 21A, 21B secured to the end of a stem 22A, 22B set through the spring 19A, 19B and passing through a hole of the plate 20A, 20B. At the opposite end, the stem 22A, 22B is secured to a forked body 23A, 23B, the branches of which are connected to a pair of plates 24A, 24B, mounted between which is the shaft 180A, 180B of the respective set of chain-tensioning sprocket wheels 18A, 18B.

According to a further characteristic, moreover associated to the two sets of chain-tensioning sprocket wheels 18A, 18B are two auxiliary cam elements 25A, 25B. In the example illustrated in FIGS. 7-10, said auxiliary cam elements 25A, 25B are in the form of levers pivoted on the fixed supporting structure 16 about two distinct axes 26A, 26B.

Each lever has a cam surface 27 (see FIG. 7) that is recalled by a secondary spring 28A, 28B against a cam-follower element constituted by a cylindrical pin 29A, 29B carried transversely by the two branches of the forked member 23A, 23B (which is mobile with the respective set of chain-tensioning sprocket wheels 18A, 18B).

Figure 8:
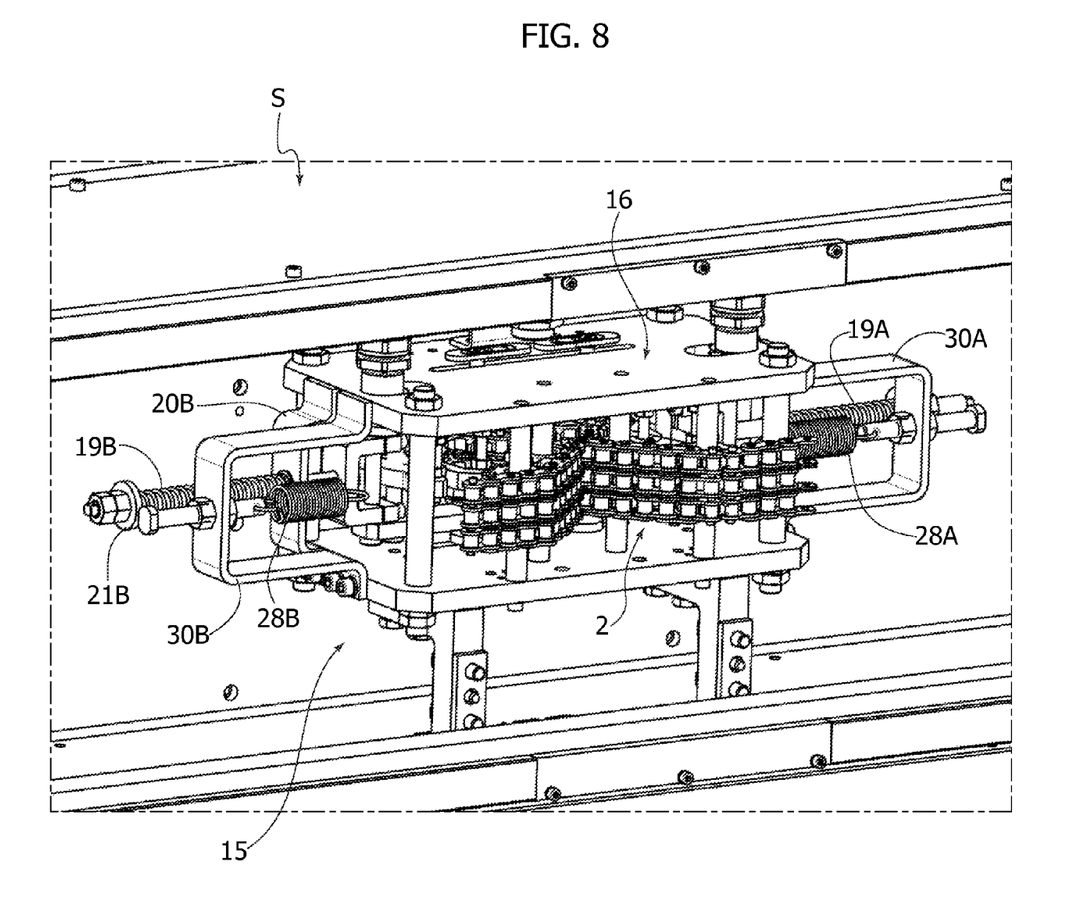
Figure 9:
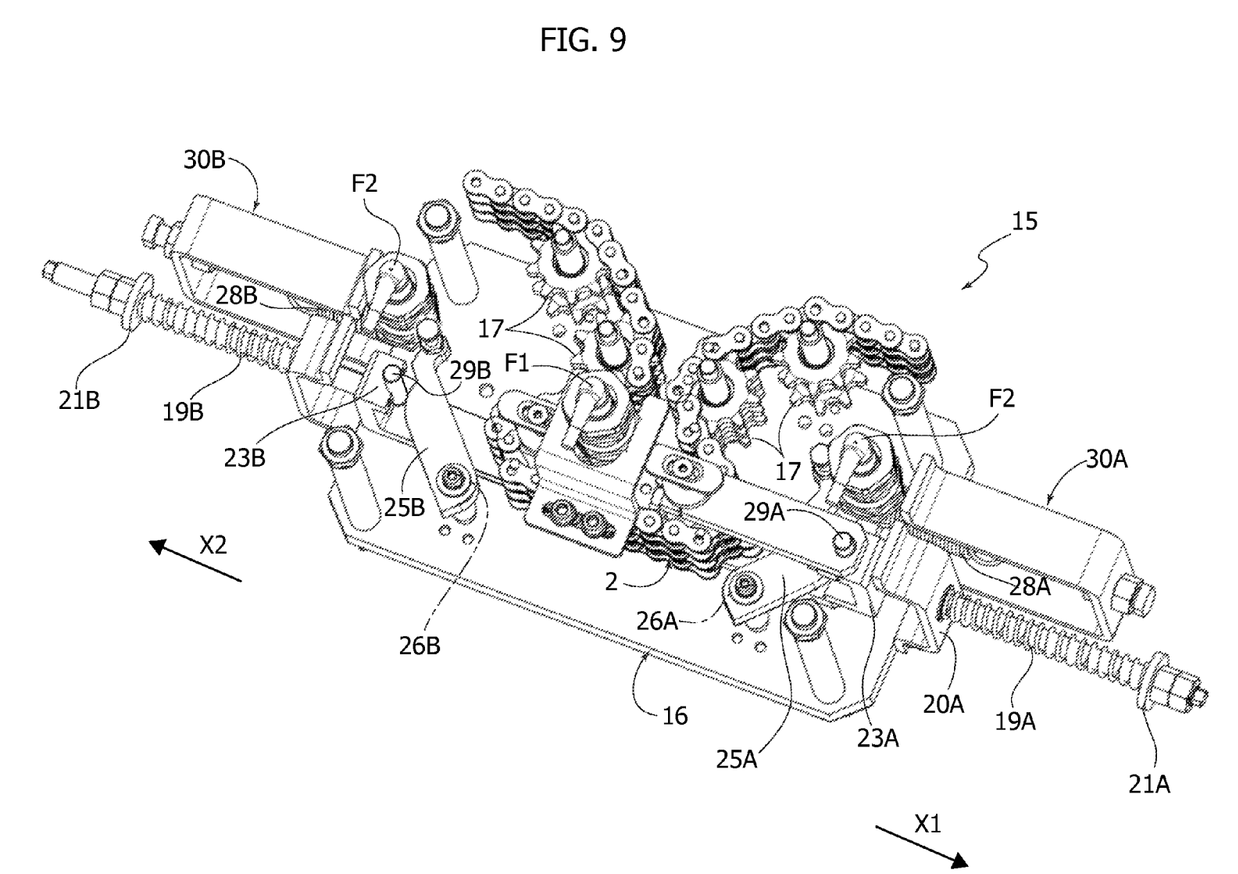
Figure 10:
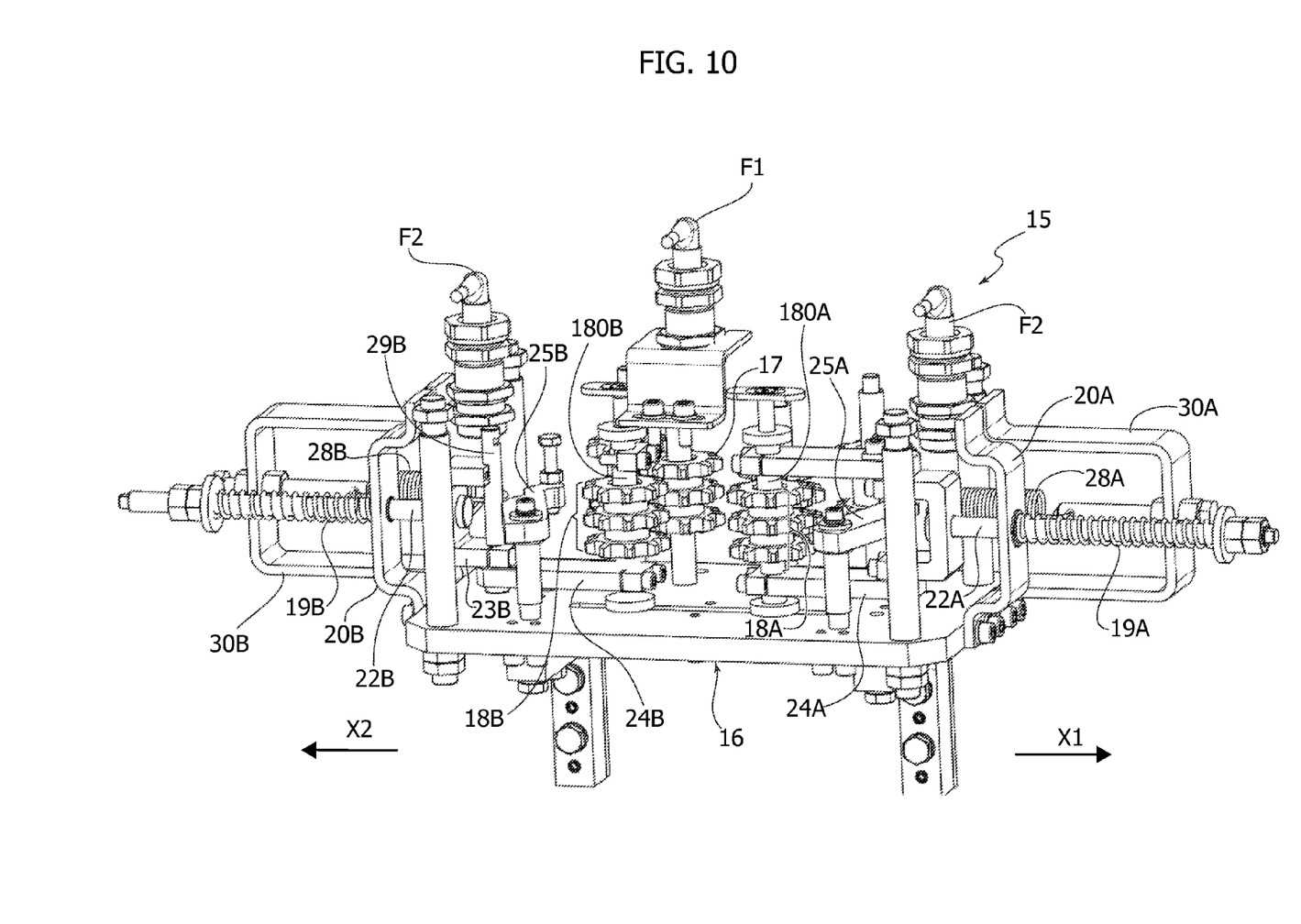

Each secondary spring 28A, 28B is a helical spring set parallel and adjacent to the respective main spring 19A, 19B and having one end anchored to a bracket 30A, 30B that in turn is secured to the fixed structure 16 (see, in particular, FIG. 8). The opposite end of each spring 28A, 28B is anchored to one end 31A, 31B of the respective lever 25A, 25B.

Thanks to the structure and arrangement described above, the chain-tensioning device 15 is able to tension the chain properly whenever the direction of movement of the chain is reversed. For example, with reference to FIG. 7, assuming that the branch of the chain 2 has slackened to the right of the device 15, the set of chain-tensioning sprocket wheels 18A automatically tensions the chain, as a result of its displacement in the direction X1 due to the tensile force exerted by the main spring 19A and by the secondary spring 28A (via the lever 25A). At the same time, the lever 25B hinders any movement in the direction X1 of the set of chain-tensioning sprocket wheels 18B. When the direction of movement of the chain is reversed, so that the branch of chain that is set to the left of the device in FIG. 7 slackens, the function of the two sets of chain-tensioning sprocket wheels 18A, 18B reverses so that the set of chain-tensioning sprocket wheels 18B is recalled in the direction X2 by the springs 19B, 28B, whilst the lever 25A hinders any movement in the direction X2 of the set of chain-tensioning sprocket wheels 18A.

Figure 7:
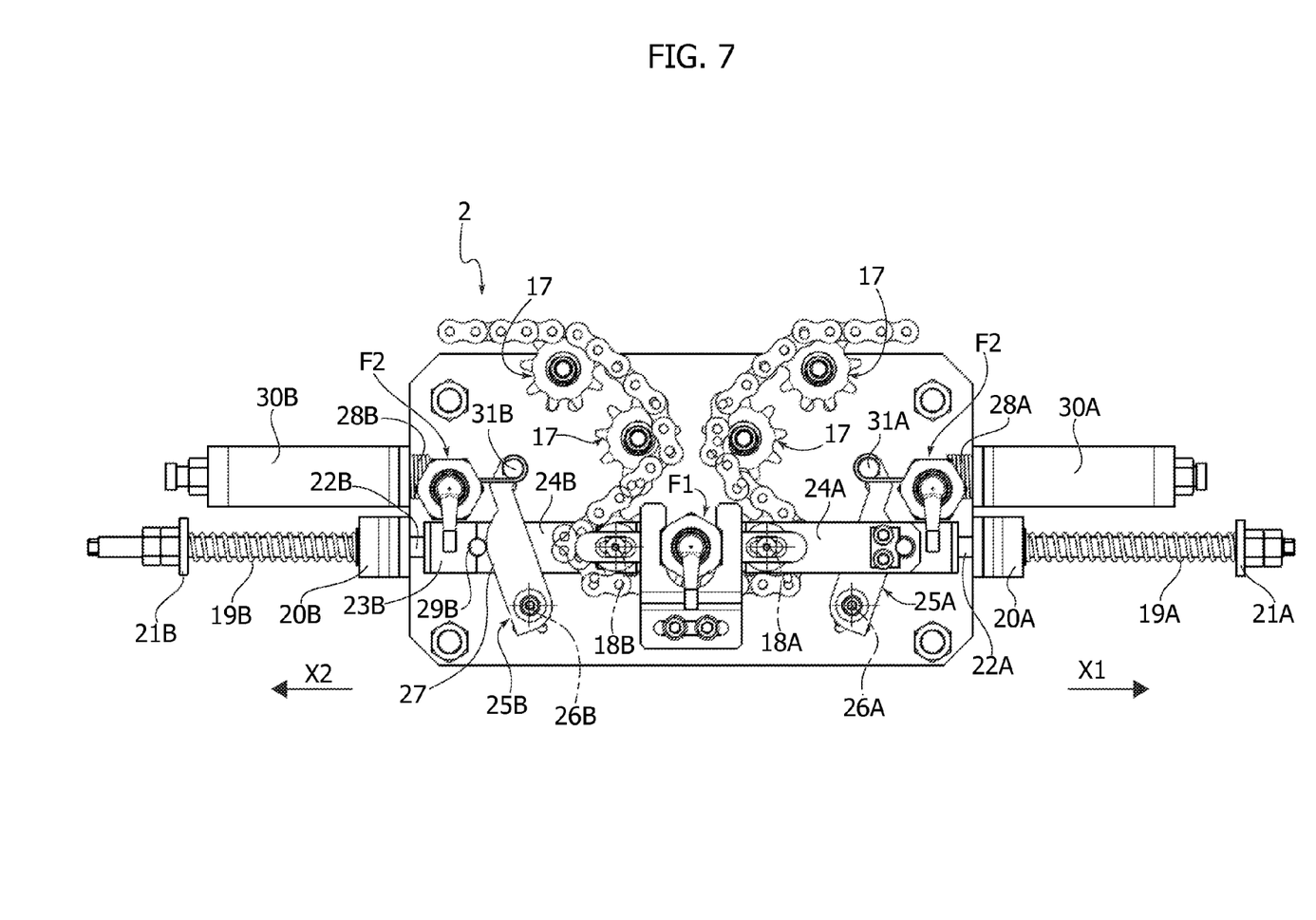
FIGS. 7-10 are a side view and perspective views of a double-acting chain-tensioning device used in the conveyor according to the invention.

A further characteristic lies in the fact that the cam surface 27 of each of the levers 25A, 25B is shaped in such a way as to maintain substantially constant the overall force due to the main spring 19A, 19B and to the auxiliary cam element 25A, 25B, applied to the respective main chain-tensioning sprocket wheel 18A, 18B as the deformation of the main spring varies 19A, 19B.

The chain-tensioning device is also able to recover automatically any play that may occur in the chain resulting wear.

Figure 12:
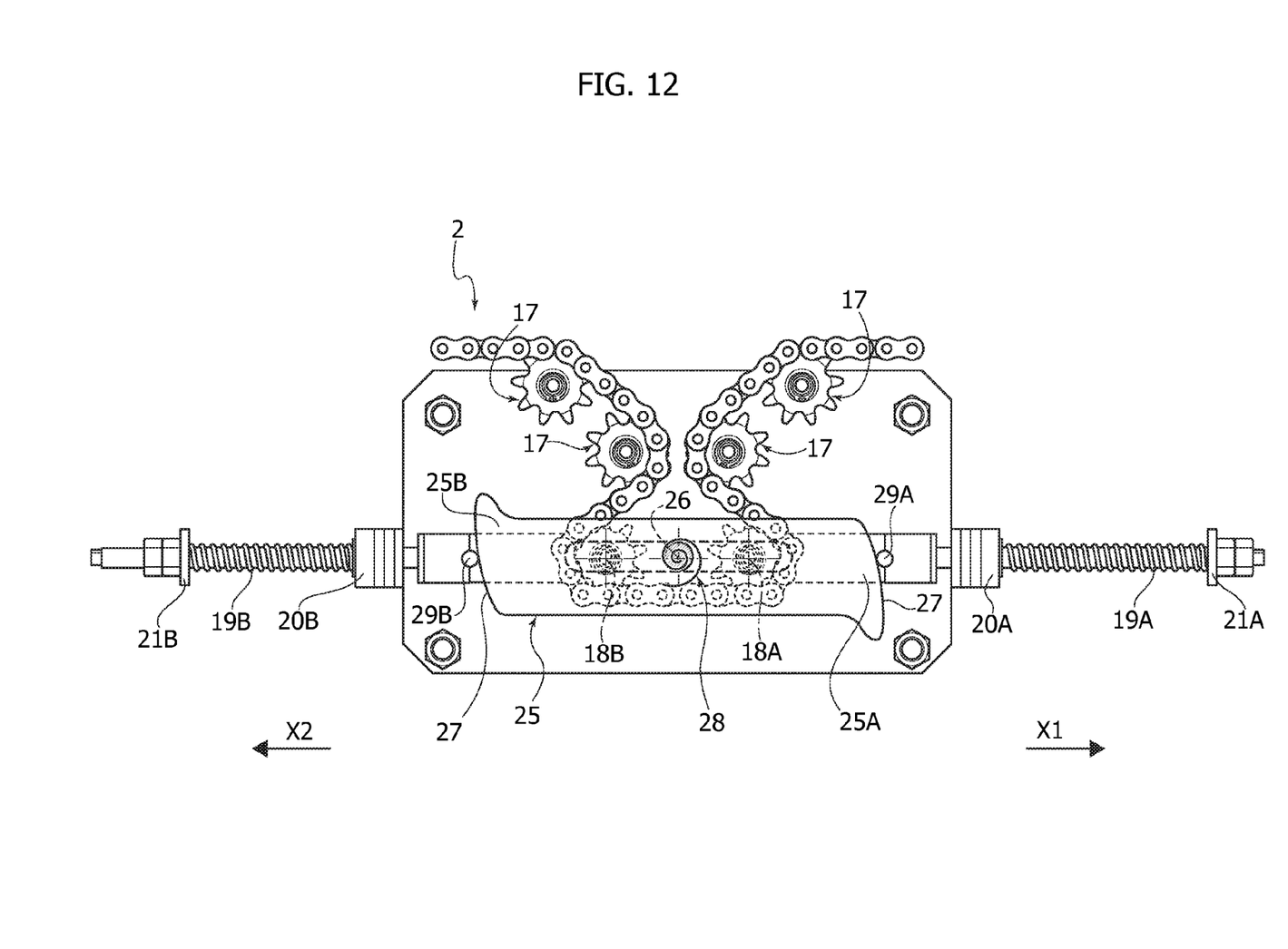
FIG. 12 illustrates a preferred variant of the chain-tensioning device.

The device 15 is moreover provided with sets of sensors F1, F2 of any known type (see FIG. 9) designed to detect the position of the levers 25A, 25B and also when the distancing between the shafts of the sprocket wheels 18A, 18B exceeds a pre-set value, in which case there may be envisaged, for example, automatic arrest of the conveyor as warning of the need for a replacement of the chain. FIG. 12 shows a variant of the chain-tensioning device in which the auxiliary cam elements (25A, 25B) are constituted by two opposite end portions of a single lever 25 articulated centrally to the supporting structure 16 of the chain-tensioning device 15 about an axis 26. Each end portion 25A, 25B has a cam surface 27 in contact with the cam-follower element 29A, 29B operatively connected to the shaft of the respective chain-tensioning sprocket wheel 18A, 18B. In this case, the auxiliary elastic means may be two helical springs that connect each end portion of the lever 25 to the fixed structure 16 or else may be constituted by a single spiral spring mounted concentrically to the axis of articulation 26 of the lever 25 and set between the lever 25 and the structure 16.

Said embodiment of the chain-tensioning device is preferred in so far as it enables operations of assembly and adjustment of the device that are simpler and faster since the device is calibrated automatically with installation of the lever 25.

In a variant, the pin for articulation of the lever 25 is slidably guided at its ends within slits, which may also be the same slits as those for guiding the shafts of the chain-tensioning sprocket wheels in such a way that the device is able to detect, with the aid of sensor means of any type, any possible malfunctioning that may lead to a displacement of the pin of the lever with respect to a normal neutral position where the opposed forces to which it is subjected balance out.

Of course, without prejudice to the principle of the invention, the details of construction and the embodiments may vary widely with respect to what has been described and illustrated herein purely by way of example, without thereby departing from the scope of the present invention.

What is claimed is:

1. A production system including a production line or cell and an accumulation conveyor for feeding a plurality of different types of components to said production line or cell, said accumulation conveyor being designed to recirculate a plurality of pallets along an endless horizontal path, said system comprising:
   an accumulation conveyor having a supporting structure;
   an endless chain engaged on sprocket wheels rotatably mounted about vertical axes on said supporting structure;
   a motor controlling movement of said endless chain;
   a loading area adjacent to said accumulation conveyor for loading of said components on the accumulation conveyor;
   an unloading area where said components are unloaded from said accumulation conveyor to be transferred to said production line or cell, said unloading area being adjacent to said accumulation conveyor and being located at a position spaced apart from said loading area along said endless horizontal path;
   a plurality of pallet-carrying members drawn by said chain along said endless horizontal path, each pallet-carrying member being provided with means for engaging the chain that enable said chain to move freely with respect to a pallet-carrying member such as where the latter is stopped in a given position along the accumulation conveyor;
   a plurality of independent pallets, each carried by a respective pallet-carrying member and prearranged for conveying one or more of said components of different types from said loading area for receiving said components on the accumulation conveyor to said unloading area where said components are unloaded from the accumulation conveyor;
   an electronic control station having one of a predetermined component sequence or a detector adapted to detect a component sequence of said components to be supplied to said production line, the electronic control station adapted to output a component sequence signal; and
   an electronic control unit in signal communication with said electronic control station and said motor, said electronic control unit adapted to receive said electronic control station output signal and control said motor to selectively drive said pallets in a selected one direction of circulation or in the other direction in response to the electronic control station component sequence signal to supply the required component to the production line.

2. The system according to claim 1, wherein said pallets further comprise a plurality of supports adapted to contact at least one of components of different models of motor vehicle and different components for each model of motor vehicle to enable rapid variation of the type and quantities of the vehicle models produced and achieve corresponding vehicle production percentages.

3. The accumulation conveyor according to claim 1, wherein the pallets are coupled to respective pallet-carrying members prearranged along the accumulation conveyor so that it is possible to replace any number of pallets prearranged on the accumulation conveyor in order to have pallets adapted to any specific desired type of component and to any specific desired mix of components.

4. The accumulation conveyor according to claim 1, wherein the accumulation conveyor comprises a single chain-tensioning device for tensioning the chain in the two opposite directions so as to guarantee proper tensioning of the chain whatever the direction of movement of the chain.

5. An accumulation pallet conveyor for feeding a plurality of different types of components to a production line or cell, designed to recirculate a plurality of pallets in an endless horizontal carousel, said conveyor comprising:
   a supporting structure;
   an endless chain engaged on sprocket wheels rotatably mounted about vertical axes on said supporting structure;
   a motor connected to said endless chain for selectively driving said endless chain;

a plurality of pallet-carrying members drawn by said chain along said endless horizontal carousel, each pallet-carrying member being provided with means for engaging the chain that enable said chain to move freely with respect to a pallet-carrying member in the case where the latter is stopped in a given position along the conveyor;

a plurality of pallets, each carried by a respective pallet-carrying member and prearranged for conveying one or more components of different types from an area for receiving said components on the conveyor to an unloading area where said components are unloaded from the conveyor;

a plurality of pallets, each carried by a respective pallet-carrying member and prearranged for conveying one or more components of different types from an area for receiving said components on the conveyor to an unloading area where said component are unloaded from the conveyor;

an electronic control station having one of a predetermined component sequence or a detector adapted to detect a component sequence of said components to be supplied to said production line, the electronic control station adapted to output a component sequence signal; and an electronic control unit in a signal communication with said electronic control station and said motor, said electronic control unit adapted to receive said electronic control station output signal and control said motor to selectively drive said pallets in a selected on direction of circulation or in the other direction in response to the electronic control station component sequence signal to selectively provide said respective components to the production line;

a single chain-tensioning device for tensioning the chain in the two opposite directions so as to guarantee proper tensioning of the chain whatever the direction of movement of the chain, the chain tensioning device further comprising:

two main chain-tensioning sprocket wheels on which the chain engages in succession;

two main springs that recall the shafts of said main chain-tensioning sprocket wheels in two mutually opposite directions; and two cam surfaces formed on two auxiliary cam elements or on a single auxiliary element, which engage cam-follower elements operatively connected to the shafts of said main chain-tensioning sprocket wheels so as to tend to push said shafts in said mutually opposite directions under the action of auxiliary elastic means, in such a way that, for each direction of movement of the chain, one of said main chain-tensioning sprocket wheels tensions the chain as a result of its displacement in a first direction caused by the main spring and by the cam surface associated thereto, whilst the other chain-tensioning sprocket wheel is hindered by the cam surface associated thereto from moving in said first direction, the aforesaid functions of the two main chain-tensioning sprocket wheels and the functions of the two cam surfaces being reversed with each other when the direction of movement of the chain is reversed.

6. The conveyor according to claim 5, wherein the cam surfaces are formed on two levers pivotally mounted on the supporting structure of the chain-tensioning device about two axes set at a distance from one another and each having a cam surface in contact with a cam-follower element operatively connected to the shaft of a respective chain-tensioning sprocket wheel.

7. The conveyor according to claim 6, wherein the cam surface is shaped in such a way as to maintain substantially constant the overall force due to the main spring and to the auxiliary cam element, applied to the respective main chain-tensioning sprocket wheel, as the deformation of the main spring varies.

8. The conveyor according to claim 5, wherein the cam surfaces are formed on two opposite end portions of a single lever articulated centrally to the supporting structure of the chain-tensioning device, each end portion having a cam surface in contact with a cam-follower element operatively connected to the shaft of a respective chain-tensioning sprocket wheel.

9. The conveyor according to claim 8, wherein the cam surface is shaped in such a way as to maintain substantially constant the overall force due to the main spring and to the auxiliary cam element, applied to the respective main chain-tensioning sprocket wheel, as the deformation of the main spring varies.

10. A production system for use in conveying assembly components in an industrial assembly plant comprising:

an accumulation conveyor having an endless path of travel, the conveyor further comprising:

a support structure having a plurality of sprockets wheels rotatably mounted to the support structure;

an endless chain engaged with a plurality of sprocket wheels;

a motor for selectively driving the chain in a first direction and a second direction along the path of travel;

a plurality of pallet-carrying members connected to said chain, said pallet carrying members operable to allow said chain to move freely with respect to a pallet-carrying member on stoppage of travel of the pallet-carrying member along the path of travel;

a plurality of independent pallets for supporting a plurality of predetermined assembly components, each respective pallet is removably connected to a pallet carrying member for movement along the path of travel;

a load station for sequentially loading said assembly components on the plurality of pallets;

an unload station positioned proximate a production line for sequentially unloading said assembly components off the plurality of pallets; and a programmable control unit in electronic communication with the motor, wherein the programmable control unit selectively activates the motor to selectively drive said chain in one of the first or the second directions along the path of travel dependent on the predetermined sequence of assembly components to be conveyed to the production line.

11. The production system of claim 10 wherein the plurality of pallets further comprises a first pallet for supporting a first assembly component and a second pallet for supporting a second assembly component, the second assembly component different than the first assembly component.

12. The production system of claim 11 wherein the first assembly component comprises a first vehicle model assembly component and the second assembly component comprises a second vehicle model assembly component the second vehicle model assembly component different than the first vehicle model assembly component.

13. The production system of claim 11 wherein the chain second direction is the reverse of the chain first direction along the path of travel.

14. The production system of claim 10 further comprising:
an electronic control station in electronic communication with the control unit, the control station operable to at least one of establish or detect the sequence of assembly components to be conveyed by the accumulation conveyor to the production line.

* * * * *